(12) United States Patent
Doll et al.

(10) Patent No.: US 11,255,355 B2
(45) Date of Patent: Feb. 22, 2022

(54) APPLICATION-BASED CONTROL OF PNEUMATIC VALVE ASSEMBLIES

(71) Applicant: Festo SE & Co. KG, Esslingen (DE)

(72) Inventors: Matthias Doll, Wernau (DE); Rüdiger Neumann, Ostfildern (DE); Stefan Elmer, Pfedelbach (DE); Peter Hofmann, Grafenau-Doeffingen (DE); Bernd Schneider, Weil im Schönbuch (DE)

(73) Assignee: Festo SE & Co. KG, Esslingen (DE)

( * ) Notice: Subject to any disclaimer, the term of this patent is extended or adjusted under 35 U.S.C. 154(b) by 120 days.

(21) Appl. No.: 15/968,697

(22) Filed: May 1, 2018

(65) Prior Publication Data

US 2018/0245608 A1 Aug. 30, 2018

Related U.S. Application Data

(63) Continuation of application No. PCT/EP2015/075584, filed on Nov. 3, 2015.

(51) Int. Cl.
*G05D 7/00* (2006.01)
*G05D 11/00* (2006.01)
(Continued)

(52) U.S. Cl.
CPC ............ *F15B 13/085* (2013.01); *F15B 11/04* (2013.01); *F15B 13/0832* (2013.01);
(Continued)

(58) Field of Classification Search
CPC .............. F15B 13/0839; F15B 13/085; F15B 13/0889; F15B 11/04; F15B 13/0814;
(Continued)

(56) References Cited

U.S. PATENT DOCUMENTS

| 5,880,957 A | 3/1999 | Aardema et al. |
| 7,926,409 B2 | 4/2011 | Arbter et al. |

(Continued)

FOREIGN PATENT DOCUMENTS

| CN | 101275593 A | 10/2008 |
| CN | 104204554 A | 12/2014 |

(Continued)

OTHER PUBLICATIONS

Written opinion of International application PCT/EP2015/075584 of which this application is a continuation, dated Jul. 29, 2016.
(Continued)

*Primary Examiner* — Zhipeng Wang
(74) *Attorney, Agent, or Firm* — Falk Ewers; Ewers IP Law PLLC

(57) ABSTRACT

An electronic valve controller for an open-loop and closed-loop control of a valve island includes four or eight valve disks having pneumatic valves configured to perform a motion task. Applications for the open-loop and closed-loop control of the valve island can be loaded onto the electronic valve controller. The invention further relates to a valve assembly, which is controlled in an open-loop and closed-loop manner by an electronic valve controller, to a corresponding method, and to a system.

21 Claims, 6 Drawing Sheets

Code Generation Phase | Execution Phase

(51) Int. Cl.
*F15B 13/08* (2006.01)
*G05B 19/042* (2006.01)
*F15B 11/04* (2006.01)
*F16K 31/42* (2006.01)

(52) U.S. Cl.
CPC .......... *F16K 31/42* (2013.01); *G05B 19/0426* (2013.01); *F15B 13/0814* (2013.01); *F15B 13/0839* (2013.01); *F15B 13/0889* (2013.01); *F15B 2211/3057* (2013.01); *F15B 2211/526* (2013.01); *F15B 2211/75* (2013.01); *F15B 2211/8855* (2013.01); *G05B 2219/23333* (2013.01); *G05B 2219/25312* (2013.01)

(58) Field of Classification Search
CPC .......... F15B 13/0832; F15B 2211/3057; F15B 2211/526; F15B 2211/75; F15B 2211/8855; F15B 11/006; F15B 13/086; F15B 13/0867; F15B 15/202; F15B 19/005; F15B 21/087; F16K 31/42; G05B 19/0426; G05B 2219/23333; G05B 2219/25312
See application file for complete search history.

(56) References Cited

U.S. PATENT DOCUMENTS

| | | | |
|---|---|---|---|
| 9,851,019 | B2 * | 12/2017 | Shields ............... F16K 37/0083 |
| 9,886,041 | B2 | 2/2018 | Maichl et al. |
| 2005/0096756 | A1 | 5/2005 | Quast et al. |
| 2006/0240682 | A1 | 10/2006 | Kuhbauch |
| 2007/0270006 | A1 | 11/2007 | Herges |
| 2008/0236683 | A1 * | 10/2008 | Arbter ................... F15B 13/085 137/561 R |
| 2009/0234508 | A1 | 9/2009 | Kallfass et al. |
| 2013/0327403 | A1 * | 12/2013 | Jensen ................ F16K 37/0083 137/1 |
| 2014/0336829 | A1 | 11/2014 | Maichl et al. |
| 2015/0045971 | A1 | 2/2015 | Endel et al. |
| 2015/0346733 | A1 | 12/2015 | Yates et al. |
| 2016/0098042 | A1 | 4/2016 | Shinkle |
| 2018/0245608 | A1 | 8/2018 | Doll et al. |

FOREIGN PATENT DOCUMENTS

| | | |
|---|---|---|
| DE | 200 06 295 U1 | 8/2000 |
| DE | 20006295 U1 | 8/2000 |
| EP | 1710447 A1 | 10/2006 |
| EP | 1975418 A1 | 10/2008 |
| JP | 2008516844 A | 5/2008 |
| JP | 2015518996 A | 7/2015 |
| WO | 98/25189 A1 | 6/1998 |
| WO | 9825189 A1 | 6/1998 |
| WO | 2006045489 A1 | 5/2006 |
| WO | 2013/107466 A1 | 7/2013 |
| WO | 2017076430 A1 | 5/2017 |

OTHER PUBLICATIONS

International Search Report, and English-language translation thereof, of International application PCT/EP2015/075584 of which this application is a continuation, dated Jul. 29, 2016.

Office Action issued in Chinese Counterpart Application No. CN 201580084297.7, dated May 21, 2020 and English language translation thereof.

Office Action issued in European Counterpart Application No. EP 15 791 282.5, dated Jul. 2, 2020 and English language machine translation thereof.

Office Action issued in Chinese Counterpart Application No. CN 201580084297.7, dated Dec. 30, 2020 and English language translation thereof.

Office Action dated Dec. 24, 2020 issued in Korean counterpart application No. 10-2018-7033232 and English-language translation thereof.

Office Action dated Dec. 8, 2020 issued in Japanese counterpart application No. 2018-554741 and English-language translation thereof.

Hong, Computer Aided Engineering of Material Forming, pp. 86-87, Metallurgica Industry Press, May 2015, 1st Edition and an English translation thereof.

Office Action dated Jun. 16, 2021 issued in Korean counterpart application No. 10-2018-7012047 and English-language translation thereof.

Office Action dated Jun. 28, 2021 issued in Chinese counterpart application No. 201580084297.7 and English-language translation thereof.

Office Action dated Dec. 1, 2021 issued in Korean counterpart application No. 10-2018-7012047 and English-language translation thereof.

* cited by examiner

APPLICATION-BASED CONTROL OF PNEUMATIC VALVE ASSEMBLIES

CROSS REFERENCE TO RELATED APPLICATIONS

This application is a continuation application of International application PCT/EP2015/075584, filed Nov. 3, 2015, which is hereby incorporated by reference in its entirety.

TECHNICAL FIELD

The present disclosure concerns the field of electropneumatics and relates in particular to an electronic valve controller for the open-loop control and closed-loop control of a pneumatic movement task which is to be executed with a valve assembly, to a valve assembly which is controlled in an open-loop manner and controlled in a closed-loop manner with a valve controller, and to a method for the open-loop control and closed-loop control of a valve assembly and to a pneumatic movement control system.

BACKGROUND

In the related art, it is known to activate fluidically operable actuators via an electronic control device, e.g., in the form of a memory-programmable controller, in that an activation signal is provided by control electronics to a valve device. The memory-programmable controller can be used to provide pre-configured desired valves which can be selected for controlling the valve functions.

It is known from WO 2013/107466 to specifically configure a fluid control unit with individual fluid control valves. To this end, it is necessary to record pneumatic parameters relating to the fluid control valves and a piston-cylinder assembly, on which a movement task is to be executed. After a user has determined a valve function, a configuration file can be produced which contains open-loop control and closed-loop control parameters for the activation of the valve disk.

In this connection, it has proven to be disadvantageous that the amount of executable pneumatic movement tasks is already pre-configured. Therefore, the previous system does not prove to be flexible enough to be able to implement different technical applications.

SUMMARY

It is an object of the present disclosure to improve a pneumatic system in terms of flexibility and closed-loop control options. Furthermore, the costs and the required installation outlay are to be reduced.

This object is achieved by providing the electronic valve controller and the method for the open-loop control and closed-loop control of a pneumatic valve assembly disclosed herein.

The achievement of the object will be described hereinafter with reference to the exemplary embodiments of an electronic valve controller. Features, advantages or exemplary embodiments mentioned therein are likewise also to be transferred to the exemplary embodiments of a method for the open-loop control and closed-loop control of a pneumatic valve assembly and vice versa. In other words, the method can also be developed with the features which are disclosed in conjunction with the exemplary embodiments of an electronic valve controller. In so doing, the corresponding functional features of the method are embodied by corresponding hardware modules, in particular microprocessor modules, of the device (or of the system or of the product) and vice versa.

According to an aspect of the disclosure, the aforementioned object is achieved by an electronic valve controller for the open-loop control and closed-loop control of a valve assembly having at least one pneumatic valve for a pneumatic movement task. In accordance with the disclosure, one application from a set of provided, different applications for the open-loop control and closed-loop control of the valve assembly is loaded or loadable in an executable manner on the electronic valve controller to execute the pneumatic movement task.

The application is generated as an executable program code and can be read-in and used or executed directly on the valve island. The application includes control commands for the valve assembly. It is not necessary to connect yet a further electronic entity therebetween. On a calculation unit, different applications are generated in a code generation phase—depending upon the desired movement task or valve function—and are provided as a set of applications for selection by a user. Then, in an execution phase the user can select at least one specific application from the set of applications for the open-loop control and closed-loop control of the respective specific movement task. Reference may be made expressly to the fact that the user can also select a plurality of applications from the set of available applications for open-loop control/closed-loop control. In order to generate the application, the calculation unit can access a model and a library of application objects. The application can be executed on one or a plurality of execution units (as a distributed system). In a typical embodiment, the execution unit is the electronic valve controller. However, alternatively or cumulatively the execution unit used can also be a further electronic unit having the corresponding technical requirements (processor performance, storage space, input ports, output ports or interfaces etc.), e.g., a microcontroller or a valve disk or a control apparatus in the form of a memory-programmable controller. In other words, the respective execution unit can again be designed as a distributed system.

According to a typical embodiment, the valve assembly is a so-called valve island which comprises a plurality, in particular 4 or 8, valve disks, wherein the valve disks can have an identical structure or can be controlled in an open-loop manner and controlled in a closed-loop manner centrally via the electronic valve controller. The electronic valve controller is likewise arranged locally on the valve island. Alternatively, it can be designed as a distributed system, wherein the individual controller modules exchange data. The controller modules can be designed as microcontrollers e.g., on the valve disks.

The individual valve disks of a valve island are valve modules having four valves. The valves are control elements for controlling the working elements or apparatuses (such as e.g., a piston-cylinder assembly). The valve disks can each execute different types of movement, movement tasks or pneumatic functions and therefore can be activated differently. It is also possible that one and the same valve disk sequentially executes different partial movement tasks in different types of embodiment (throttled, noise-reduced, etc.) and is activated accordingly. The valve disks of a valve island can execute different types of movement and movement tasks in parallel in the same time interval. Therefore, the movement task also includes an execution mode which can be controlled in a closed-loop manner, a movement type (throttled, energy-efficient, etc.) which can be adjusted by the user.

For its part, a valve disk comprises an electronic valve disk controller which serves to activate the four valves of the valve disk. These four valves are connected in the manner of an electrical Wheatstone bridge to be able to provide or execute superior valve functions.

According to an exemplary embodiment of the disclosure, the electronic valve controller has a plurality of interfaces, comprising pneumatic connections and electric connections, and data connections which can be designed as (possibly different) bus systems which can be operated with different protocols. The electronic valve controller comprises in particular an interface to a calculation unit which is designed typically as a bidirectional interface for data exchange. The calculation unit serves to produce an application on the basis of the movement task input via an editor or via another input means (electronic, acoustic, optical, etc.). The application is generated in the code generation phase. In a simple variant of the disclosure, all of the selectable applications are generated in this code generation phase and—depending upon the application—can be selected by the user and loaded onto one or a plurality of execution units for execution purposes. A modified version of an already selected and loaded application can be generated in the execution phase, in that the application is adaptively parameterised according to DESIRED specifications. It is not necessary to load the application once again onto one of the execution units.

It is expedient if the electronic valve controller has an internal measurement signal unit integrated thereon, via which the electronic valve controller receives internal or local measurement signals of the valve assembly, in particular the valve island with all of the valve disks and calculates them for closed-loop control. The calculation is affected typically directly on the electronic valve controller. Alternatively, the closed-loop control variables are relayed via a closed-loop interface to the calculation unit for processing therein. This has the advantage that the execution of the movement task can be controlled in a closed-loop manner quasi in real time with the aid of the recorded and pre-definable pneumatic conditions. Typically, the user can determine in advance which physical conditions he would like to know are considered for closed-loop control (e.g., temperature, energy, flow etc.). The closed-loop control variables are recorded according to likewise pre-definable events (time-based events, e.g., periodically or status-based events, e.g., after execution of a specific movement sequence of the movement task) and are relayed to the calculation unit or execution unit(s) for closed-loop control. Therefore, it proves to be advantageous that not only the measurement signals of a valve disk are taken into consideration but also the measurement signals of the valve disks—located in parallel in use—of the same valve island or the group of components consisting of valve disks and internal sensor signals of a piston cylinder assembly.

In a typical embodiment of the disclosure, the closed-loop control of the valves of the valve island for executing the movement task is affected on the basis of internal measurement signals of the valve island, i.e., measurement signals or sensor signals which are recorded on the valve island, and on the basis of external process signals and/or external closed-loop control variables and/or external measurement signals. As already mentioned, in the internal measurement signals, measurement signals of different valve disks can certainly be recorded and are relayed, with an allocation to the respective valve disk, to the calculation unit or execution unit(s) for the purpose of closed-loop control. Therefore, valve disk-specific closed-loop control can be executed in an advantageous manner. The external parameters (external process signals, closed-loop control variables, measurement signals) can be pneumatically relevant physical parameters which are recorded or provided outside the valve island, e.g., specifications for energy consumption, freedom from vibrations or noise generation. The external variables are typically process signals of the technical process, in the context of which the movement task is to be executed (e.g., fill level signals or position signals of the production process for moving components by means of the pneumatic valve assembly or e.g., signals of a robot etc. to be moved). A closed-loop control circuit or a corresponding closed-loop control algorithm is provided to compare the recorded ACTUAL specifications (these are typically also continuous signals or signal or curve progressions) of the respective closed-loop control parameters with pre-definable DESIRED specifications in respect of agreement and to control them in a closed-loop manner accordingly. Since these closed-loop control variables differ from application case to application case, provision is made in one exemplified embodiment that the external and internal closed-loop control variables can be defined in advance and in particular in a code generation phase, so that unnecessary measurement values do not have to be recorded and processed and instead only those measurement values which are relevant to the respective application have to be recorded and processed.

In simpler embodiments, the closed-loop control can be executed only on the basis of the internal or external closed-loop control variables.

Fundamentally, the closed-loop control ensures that a modified application is produced in that the application is parameterised with calculated DESIRED specifications and is executed in this parameterised version on the execution units. In one development, provision is made to design the data-technical system for generating the application, in particular a so-called calculation unit or the execution unit as a self-learning system. In this case, during the execution of the movement task feedback and diagnosis information is recorded (typically on execution units on which the application is executed, e.g., on the valve island or on units which exchange data with the execution units) which is relayed to the calculation unit for generating or parameterising the application. In other words, during execution of the intended movement task the valve assembly can also be controlled in an open-loop manner by different versions of the application, wherein different versions or parameterisations of an application are based upon closed-loop control variables being taken into consideration.

In a first exemplary embodiment, the generated application is loaded directly onto the electronic valve controller for execution purposes. In this case, it is no longer compulsory to use a further control unit, e.g., a memory-programmable controller. However, it can certainly be possible to optionally incorporate, in addition, an external control unit into the system, e.g., in the form of a memory-programmable controller. In this case, the application which is loaded onto the electronic valve controller is incorporated into a control program for the respective valve island which is provided on the memory-programmable controller. Therefore, the execution of the application on the electronic valve controller can be triggered, i.e., activated, via the memory-programmable controller in particular by start control commands and end control commands and optionally by an emergency shut-off facility in the event of an emergency. Therefore, in accordance with the disclosure, the open-loop control task and the closed-loop control task for the valve island are no longer implemented and executed indirectly by the memory-programmable controller (not even when this is used), but instead directly by the electronic valve controller on the valve island and thus locally on the valve island. Therefore, in a manner of speaking intelligent functionality for open-loop control and closed-loop control directly in situ can advantageously be relocated to the valve island. In another exemplary embodiment, the digital programmable control apparatus can have yet further control applications provided thereon which can be loaded onto the electronic valve controller for the purpose of executing the pneumatic movement task. However, the memory-programmable controller is typically used only to execute superordinate functions and to coordinate with other units of the technical application system (robot control etc.). The memory-programmable controller then coordinates the movement sequences in connection with, e.g., electrical drives to avoid, e.g., a collision during an EMERGENCY shut-off.

In another exemplary embodiment, the generated application is not loaded directly onto the electronic valve controller for execution purposes, but instead is loaded onto the digital programmable control apparatus. This then transmits the control commands to an execution unit, in particular to the electronic valve controller. The control commands can be incorporated into an executable program code which also prompts, e.g., the recording of specific measurement values as closed-loop control variables.

According to a further aspect of the disclosure, the aforementioned object is achieved by an execution unit, on which the generated application is loaded and executed. These units are electronic or digital processor units which are formed on a valve assembly and in particular on a valve island, in particular the electronic valve controller, a control unit (microcontroller) on an individual valve disk or an entity which exchanges data with the memory-programmable controller or the calculation unit.

According to a further aspect of the disclosure, the aforementioned object is achieved by a method for the open-loop control and closed-loop control of a pneumatic valve assembly for executing a pneumatic movement task, comprising the method steps of:

reading-in the pneumatic movement task, automatically generating an executable program code on the basis of the recorded pneumatic movement task with access to a library of application objects and distributing the individual application objects to at least one or a plurality of execution unit(s) of the valve assembly, and loading the executable program codes as an application in real time on at least one or a plurality of execution unit(s) of the valve assembly. Typically, the procedure of loading is also followed by the application being executed.

Typically, internal measurement signals of the valve island and the valve disk (valve assembly) recorded during execution of the application (and therefore during execution of the movement task by means of the valve assembly) and external process signals of the technical system are relayed as pneumatic closed-loop control variables to an execution unit to generate a modified application, namely a parameterised application (or another version of the application) and to load this onto the execution units (e.g., the electronic valve controller) for the purpose of execution. This procedure can be executed in real time and in particular in a range of 0.5 milliseconds to 5 milliseconds so that the parameterised application is available in real time on the execution units. Even when a modified application is produced (i.e., a closed-loop controlled application), this can be loaded in real time onto the execution units. This also applies to an application modified by feedback.

In practice, it has proven to be expedient that, for the open-loop control or closed-loop control of the valve assembly, the following operating conditions, i.e., execution modes or movement variants, are taken into consideration and can also be selected and applied in combination. They can be displayed, e.g., also in the form of a plug-in on a user interface, e.g., the calculation unit or another apparatus, for selection:

damping a piston movement by providing a damping function, in particular a soft stop, controlling the speed of a piston in a closed-loop manner by providing a throttle function for controlling the piston speed, providing a pressure control and/or pressure progression control, time of execution of the movement task, energy efficiency of the movement task, specification of the valve function, movement with intermediate stops and/or separate movement sections, movement task for the purpose of diagnosis, and further criteria which can be relevant for the respective application, e.g., freedom from vibrations, heat development, current consumption, and/or sound emission when executing the movement task etc.

The method can be used for controlling the valve assembly in an open-loop manner and in a closed-loop manner. It is also possible to specify the valve function. To this end, a specific application can be selected from a provided set of applications and is then loaded onto the execution units.

In order to control the valve assembly in a closed-loop manner, internal (valve island-internal) measurement signals of the valve assembly and external (valve island-external) closed-loop control variables are typically taken into consideration. At least two separate closed-loop circuits are provided: a first closed-loop circuit is located on the respective valve disk and controls the four respective valves of the valve disk in a closed-loop manner on the basis of sensors (e.g., pressure sensor or position sensor) arranged on the valve disk or on the respective valves. A second closed-loop circuit is provided on the electronic valve controller. This closed-loop circuit controls the behaviour of all of the valve disks of the valve island, also in relation to one another in a closed-loop manner. It can process internal measurement signals of an internal measurement signal unit. In a further exemplary embodiment of the disclosure, a third closed-loop circuit can be provided. The third closed-loop circuit can be located outside the valve island on an electronic component or on the memory-programmable controller and can process external sensor signals, e.g., pressure signals or other sensor signals (temperature etc.) which then move an actuator (gripper) to a specific position to prevent a collision in the event of an EMERGENCY shut-off. In this connection, process signals of an external sensor unit are processed. The memory-programmable controller can be used also to control the correct sequence of the respective movement tasks of the individual valve disks of the valve island by means of corresponding commands (e.g., "move cylinder 1 from A to B and after an interval of 5 seconds move cylinder 1 in a throttled manner from B to C and cylinder 2 from A to D"). In a further exemplary embodiment of the disclosure, a fourth closed-loop circuit can be implemented which adapts or parameterises the application with the aid of specifications of the user with respect to the execution mode of the movement task (damped, noise-reduced, etc.). The specifications are input via a user interface and are then calculated automatically by means of an algorithm into DESIRED specifications which are used for parameterising the application. The application comprises 2 segments: a main part and a desired specification-dependent part which is parameterised differently by corresponding desired specifications. The main part of the application remains unchanged even during parameterisation. This has the advantage that even when the execution mode of the movement task is changed or in the case of changed closed-loop control variables, it is not necessary to re-compile and repeatedly load the application. Therefore, the process costs and management outlay can be considerably reduced. This superordinate closed-loop circuit can be produced by regenerating and subsequently downloading an application onto the execution unit(s).

According to a further aspect of the disclosure, the aforementioned object is achieved by a pneumatic movement control system for the open-loop control and closed-loop control of a pneumatic valve assembly for executing a pneumatic movement task, comprising:

an editor as a user interface for recording the pneumatic movement task;

a calculation unit which is configured, on the basis of the recorded pneumatic movement task, to generate an executable program code or select an already generated program code which is provided as an application and to parameterise this code with the aid of closed-loop control data and/or process signals; and at least one execution unit which is arranged on the valve assembly and in each case is designed to read-in the application and execute it to control the valve assembly in an open-loop manner according to the recorded movement task and/or to control the valve assembly in a closed-loop manner on the basis of internal variables and closed-loop control variables.

The pneumatic movement control system comprises at least one internal measurement signal unit which is used for recording internal or local measurement signals of the valve assembly which are used in real time to generate the executable program code for controlling the pneumatic movement task in a closed-loop manner. Typically, each valve island comprises one such measurement signal unit.

The calculation unit of the pneumatic movement control system typically comprises:

an interpreter which is designed to separate the recorded movement task into a series of tasks;

a compositor which is designed to access a memory comprising stored application objects to select, for each task from the total set of tasks, the application objects necessary for this task to generate an executable program code therefrom;

a distributor which is designed to distribute the generated executable program code to at least one execution unit and load it at this location;

an executor which is typically designed as an execution unit to execute the generated executable program code in real time, and which is optionally designed to record internal measurement signals as closed-loop control variables and to return them to generate a modified (parameterised) executable program code.

And optionally:

a matcher which is designed to access a license memory and/or an external memory (database) storing a library of application objects requiring a license. The matcher serves to continuously optimise application generation. Typically, the compositor for generating an application accesses the internal memory comprising application objects, in which already licensed, or license-free application objects are located. However, for optimisation purposes the system can access an external memory entity which can be configured as a cloud solution in which application objects requiring a license are located. They must first be licensed by a further measure on the part of the user (after display on the user interface and agreeing to the license conditions) to be available for generating an application. The application objects in the external memory also comprise such application objects which are optimised for different conditions and criteria.

A further improvement can be achieved if the pneumatic movement control system comprises an optimisation module which is designed to optimise and/or control the pneumatic movement task in a closed-loop manner, in that during generation of the executable program code, pre-definable optimisation criteria are taken into consideration. Pre-definable optimisation criteria can be time-related criteria (duration, rapidity), energy efficiency, sound or heat development etc.

The object is further achieved by a computer program, comprising computer program code, for carrying out all of the method steps of the method described in more detail above when the computer program is executed on a computer. In this connection, it is also possible for the computer program to be stored on a computer-readable medium and to be sold as a computer program product.

BRIEF DESCRIPTION OF THE DRAWINGS

The disclosure will now be described with reference to the drawings wherein.

DESCRIPTION OF EXEMPLARY EMBODIMENTS

Figure 1:
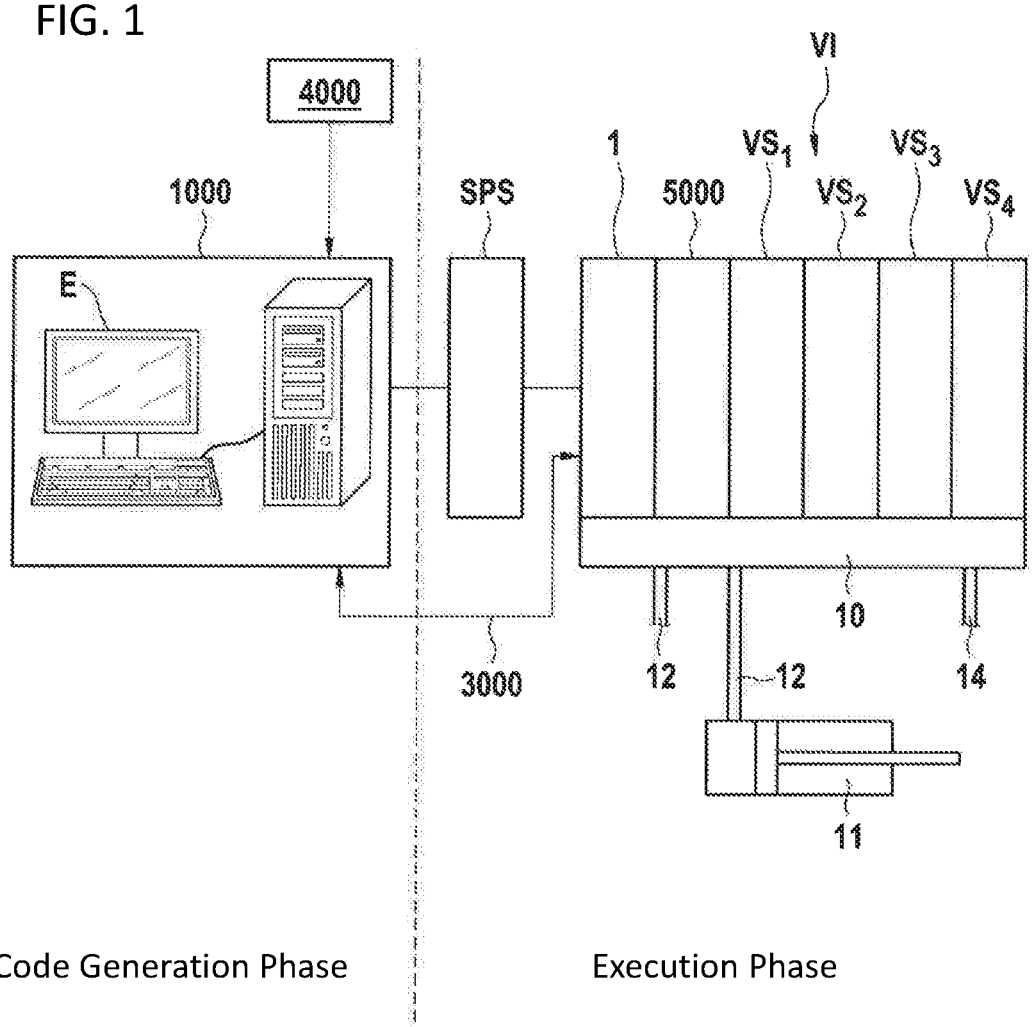
FIG. 1 shows a schematic view of a pneumatic system according to an exemplary embodiment of the disclosure.

The disclosure will be explained hereinafter in more detail with reference to the drawings, wherein:

FIG. 1 shows a schematic overview of components of an electropneumatic system according to an exemplary embodiment of the disclosure. A calculation unit 1000 comprises a processor for calculating and comprises, or is connected to, a monitor which can be designed as an editor E for inputting movement tasks. The calculation unit 1000 can be a computer unit which is illustrated by way of example on the left-hand side of FIG. 1, such as a personal computer or a network of a plurality of computer entities connected via a network. Within the scope of the application, it is likewise apparent to a person skilled in the art to provide other designs of the calculation unit 1000, e.g., mobile data processing apparatuses, such as a tablet, a handheld, a smartphone, a laptop or the like which can also be used in combination as a distributed system. The respective apparatuses of the calculation unit 1000 can be connected via a network (LAN, WLAN, etc.) to further digital and/or electronic entities of the system (SPS; electronic valve controller 1 etc.). Optionally, in one exemplary embodiment the calculation unit 1000 can exchange data with a memory-programmable control apparatus SPS; however, this is not absolutely necessary.

Fundamentally, the disclosure aims to adaptively activate pneumatic valves of a valve assembly to be able to cover different application scenarios and to be able to take closed-loop control variables, which are recorded during execution of the valve movement, into consideration during the further activation. To this end, depending upon the respective movement task of the application including further technical criteria (e.g., requirements relating to time of execution, energy consumption etc.) in a first code generation phase a program code is generated which can be executed as an application A on execution units of the electropneumatic system, e.g., on an electronic valve island controller 1, a memory-programmable control apparatus SPS or on a microcontroller 124. To this end, the application A contains inter alia valve control commands. In a second time phase, the valve movement phase or execution phase, the generated application A is executed on the execution units of the valve assembly, e.g., on the electronic valve island controller 1 of a valve island VI or on the electronic valve controllers (microcontroller 124) of a respective valve disk VS.

The two time phases can be interleaved in terms of time (interleaved mode). This proves to be advantageous in particular when, during execution of the movement, closed-loop control values are recorded which are to be used for closed-loop control of the movement task. Then, a parameterised version of the application A can be generated and executed on the execution units 1, 124, SPS without re-loading and compiling the application A. The parameterised version is based upon DESIRED specifications which are calculated from the recorded external and internal closed-loop control variables. The DESIRED specifications can be discrete or time-continuous signals (e.g., a curve progression). Therefore, as the movement task is being executed it is advantageously possible to change even an execution mode (e.g., damped, energy efficient etc.).

During the code generation phase, the calculation unit 1000 is active and intended to generate a set of applications. The calculation unit 1000 is connected via an interface to an external sensor unit 4000, via which external closed-loop control variables or process signals of the technical process (robotics, production, etc.) can be read-in. In other embodiments, the external sensor unit 4000 can also cumulatively or alternatively exchange data with the memory-programmable control apparatus SPS and/or with the electronic valve controller 1 and transmit its sensor signals to these entities for closed-loop control (this is not illustrated in FIG. 1). During the valve movement or execution phase, the respective execution unit 1, 124 is active on the valve assembly. This is to be represented in FIG. 1 by the vertical broken line. The open-loop control of the valve function and thus the movement task is affected by selecting a specific application A from the set of provided applications.

A valve island VI comprises four or eight cuboidal valve disks VS and the electronic valve island controller 1 which, centrally or as a distributed solution, is responsible for the open-loop control in each case of a valve island VI having the valve disks VS arranged thereon, and an internal measurement signal unit 5000. The internal measurement signal unit 5000 is intended to record pneumatic measurement values, such as, inter alia, pressure, stroke (travel), flow, temperature as local or internal measurement signals on the valve island VI and to relay these values to the electronic valve island controller 1 and/or to further electronic instances for processing and closed-loop control. In the code generation phase, the user can determine the parameters for which values are to be recorded and taken into consideration during calculation and for code generation. Integrated on the valve island VI can be a dummy plate for optional, further insertion modules and an interface node which can be designed, e.g., as a bus node and/or as an Ethernet, web-visual interface. All of the components of the valve island VI are fastened to a base plate 10. The base plate 10 can be produced from an extruded aluminium profile and has pneumatic connections for connecting tubes, e.g., working connections 50 (not shown in FIG. 1 but shown in greater detail in FIGS. 4a and 4b) and connections for inlet air and outlet air, in particular ventilation for sound absorbers. Furthermore, electric connections 14 for cables and electronic interfaces are provided.

FIG. 1 schematically indicates on the right-hand side that the pneumatic connection 12 serves as a working channel and is in communication with a working apparatus, in this case a piston-cylinder assembly 11, to move the assembly. As shown in FIG. 4, typically a plurality of working connections 50 are provided, in this case two per valve disk VS. In the piston-cylinder assembly 11, further sensors are designed in the form of a piston-cylinder sensor unit 6000, comprising, e.g., individual or combined end position sensors, position sensors, stroke sensors, pressure sensors etc. These internal sensor signals are relayed typically directly to the electronic valve controller 1 for closed-loop control. They can be calculated directly on the electronic valve controller 1 together with the local or internal measurement signals of the internal measurement signal unit 5000 and with external process signals of the external sensor unit 4000 for closed-loop control.

In the typical embodiment of the disclosure, all of the valve disks VS of a valve island VI have an identical structure which will be described later in connection with FIG. 2.

The electronic valve controller 1 is used for open-loop control and closed-loop control of the valves which are provided in the valve assembly VS, VI. In the typical embodiment of the disclosure, the valve assembly is formed by the valve island VI and the execution unit for executing the application A is the electronic valve island controller 1 which, centrally and simultaneously, can activate and control in a closed-loop manner a plurality (four or eight) valve disks VS of the valve island VI.

The basic principle of the disclosure is explained hereinafter with reference to FIG. 5. The calculation unit 1000 comprises the editor E or communicates data therewith (this case is illustrated in FIG. 1). The editor E serves to input a movement task of any type, such as e.g., "move a body X from position A to position B and execute this as quickly as possible," "execute throttled travel," "execute movement X and terminate it with a soft stop" etc. The movement task can comprise a plurality of task sequences or partial movements which are to be executed at definable time intervals. The movement task can also be executed in different execution modes (throttled, energy-efficient, vibration-free etc.). Fundamentally, the movement task defines the physical procedure of moving a mass within a three-dimensional space or along a path at a determinable speed and at a determinable acceleration and optionally with determinable energy consumption. Typically, the movement task is input into a provided model of a software development platform by a user. However, it is also within the scope of the disclosure to read-in the movement task to be executed from a file, in particular a parameterisation file (e.g., for platforms such as Matlab/Simulink, Codesys or the like). Likewise, the movement task can be stored in a memory. The movement task can be provided in different formats (as a text file, image file or video recording, in a machine-readable format etc.). In the underlying model, the respective pneumatic requirements are defined. The software development platform is typically designed such that the model can be simulated and tested and can automatically generate code (e.g., C++ code). The generated code is executable program code. In a typical embodiment of the disclosure, the model is generated in a Matlab-Simulink environment. Simulink® is a block diagram environment for the model-based technical development and assists the design and simulation at system level and also permits automatic code generation and continuous testing and verification of embedded systems. However, other models and platforms can also be applied.

As already mentioned, the method in accordance with the disclosure is divided basically into two time phases:

1. A code generation phase, in which an executable code in the form of an application A is generated automatically from the recorded movement task. By taking closed-loop control variables into consideration, the application A can be continuously modified and refined. For instance, the model for code generation can be designed as a self-learning system.
2. A valve movement phase or execution phase: in this phase, the movement task is actually performed, in that the valves of the valve assembly VS, VI are activated according to the specifications of the provided application A. To this end, the application A is executed on one or a plurality of execution units 1, 124 of the valve assembly VS, VI. Typically, pneumatic measurement values and measurement values relevant to the respective application case are recorded on each valve island VI in one or a plurality of internal sensor units, the measurement values being returned as closed-loop control variables for application generation or application modification to improve, refine or modify the application and to load it in a modified (in particular parameterised) version onto the execution units. Cumulatively, external closed-loop control variables can also be used for application parameterisation.

The calculation unit 1000 is provided to automatically generate the executable program code on the basis of the recorded pneumatic movement task. As can be seen in FIG. 5, the calculation unit 1000 comprises a plurality of modules which all exchange data via a network, namely an interpreter 1002 which is intended to separate the recorded movement task into a series of tasks. The tasks can be movement sequences which are to be executed consecutively. Furthermore, the calculation unit 1000 comprises a compositor 1006 which is designed to access a memory 1004 comprising stored application objects to select application objects necessary for each task from the set of tasks to generate an executable program code therefrom. Furthermore, the calculation unit 1000 is provided with a distributor 1020 which is designed to distribute the generated executable program code to at least one execution unit, namely to the electronic valve controller 1 and/or the microcontrollers 124 of a valve disk VS and/or to the memory-programmable control apparatus SPS and to load it at this location. Furthermore, the calculation unit 1000 comprises an executor 1022 which is designed to execute the generated executable program code.

In an exemplary embodiment of the disclosure, the executor 1022 is designed as an execution unit 1, 124 on the valve island VI. Alternatively or cumulatively, the executor 1022 can be provided as a superordinate entity, e.g., as a memory-programmable control apparatus SPS which assumes yet further, coordinating tasks, for instance in connection with working apparatuses of the technical process installation. The execution units 1, 124, SPS are designed not only for executing application programs but also for recording internal measurement signals of the valve assembly, in particular of the valve island VI, as closed-loop control variables and to return them to the calculation unit 1000 for generating a modified, executable program code. The closed-loop control interface 3000 is available for this purpose.

The generated application A can be loaded directly onto the electronic valve controller 1 and/or onto the other distributed execution units for execution purposes. In this case, the use of a memory-programmable controller SPS for activating the valve assembly VS, VI is no longer absolutely necessary. It is also possible for the application A or parts thereof to be loaded onto the control apparatus SPS which then relays the code to the electronic valve controller 1 for control purposes. Typically, after the application A is loaded onto the electronic valve controller 1, the program code is incorporated on the memory-programmable controller SPS so that it can trigger the program sequence. Therefore, the memory-programmable controller SPS can be used to transmit at least one start command and one end command for the movement task to the electronic valve controller 1.

Furthermore, in a typical embodiment of the disclosure the calculation unit 1000 comprises a matcher 1008 which is designed to access a license memory 1010 and/or an external memory 2000, in which a library of application objects requiring a license is stored in each case. The external memory 2000 can be designed as a cloud-based library of application objects. The license memory 1010 stores license data relating to the application objects. The matcher 1008 is designed to optimise the generation of the executable program code in terms of different aspects. This is achieved by analysing whether application objects requiring a license exist in the license memory 1010 and/or the external memory 2000 which are suitable (and possibly more suitable) for executing the recorded movement task taking into consideration internal and external closed-loop control variables than the previous application objects which have been previously used from the memory 1004. If this is the case and "better" application objects are provided for the movement task under the recorded measurement conditions (by means of the recorded closed-loop control variables), the type of available application objects and their license conditions can be displayed to the user on a user interface. If the user agrees with the license conditions by paying a corresponding license fee, the respective application object requiring a license can be loaded from the external memory 2000 and/or from the memory 1004 (if this also comprises application objects requiring a license) and can be used for generating the application A. In parallel, the license data record is updated in the license memory 1010. The acquired or licensed application object can be relayed to the compositor 1006. It should be noted that the user interface for inputting the movement task and displaying the suitable application objects requiring a license from the memory 1010 do not have to correspond.

In a typical embodiment of the disclosure, the editor E and the calculation unit 1000 are located on the same system, whereas the electronic valve controller 1 and the valve assembly VS, VI are integrated in one component which, however, is located at a remote location (distributed system) or is connected via corresponding data interfaces. In an alternative embodiment of the disclosure, additional structural and/or computer-based units can also be provided in this case so that e.g., the editor E is not located on the system of the calculation unit 1000.

The pneumatic movement control system advantageously comprises an optimisation module which is designed for optimisation and/or closed-loop control of the pneumatic movement task, in that, during generation of the executable program code, pre-definable optimisation criteria are taken into consideration, e.g., optimisation of required time, energy, compressed air etc.

Figure 5:
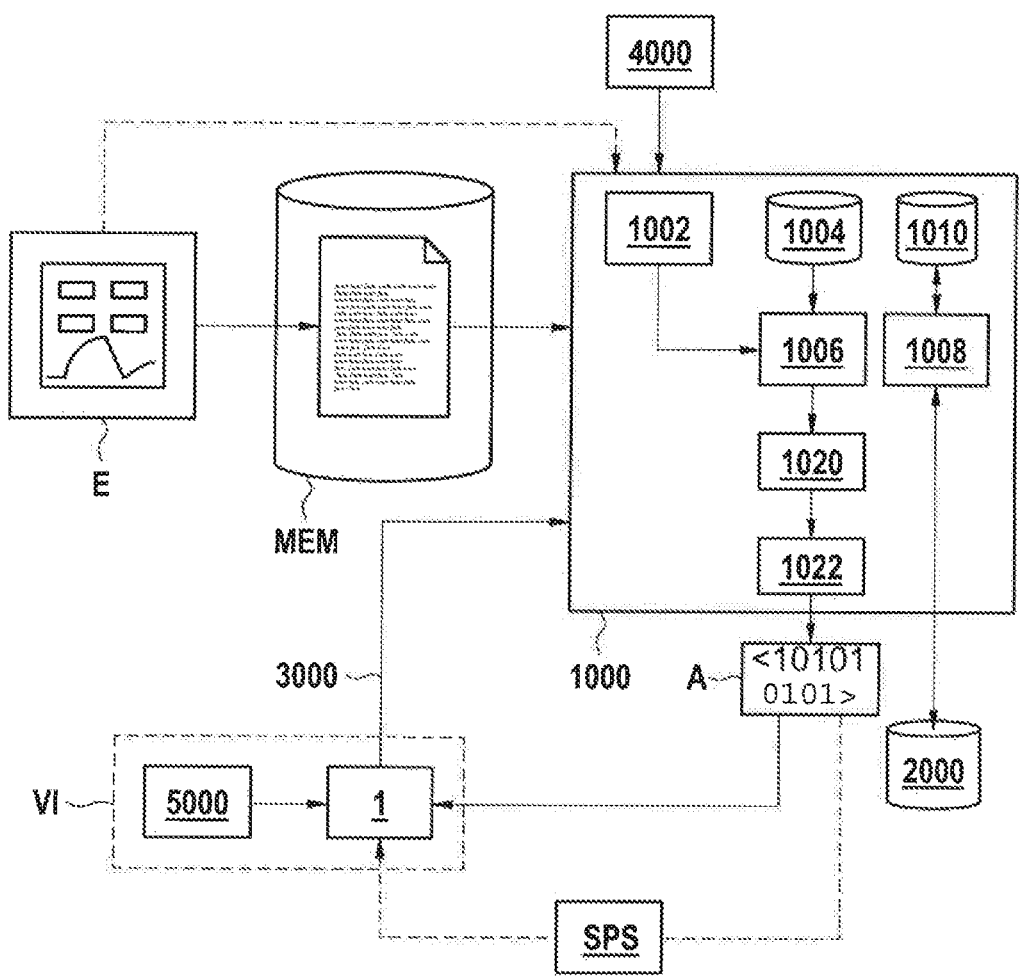
FIG. 5 shows an overview of components of the pneumatic system according to an exemplary embodiment of the disclosure and the interaction thereof.

As illustrated in FIG. 5, closed-loop control variables are taken into consideration during generation of the executable program code. In a typical embodiment of the disclosure, these variables are both internal and external closed-loop control variables. "Internal" means in this context physical measurement signals which are recorded on the internal measurement signal unit 5000 which is arranged on the electronic valve controller 1 so that they are valve island-internal and local measurement signals. "External" is intended to denote that any pneumatically relevant external closed-loop control variables (i.e., valve island-external and, e.g., central or global variables) can be read-in and taken into consideration for generating the application A. The external closed-loop control variables are read-in from an external sensor unit 4000. The internal control variables are returned via the closed-loop control interface 3000 from the valve island or electronic valve controller 1 to the calculation unit 1000.

Figure 2:
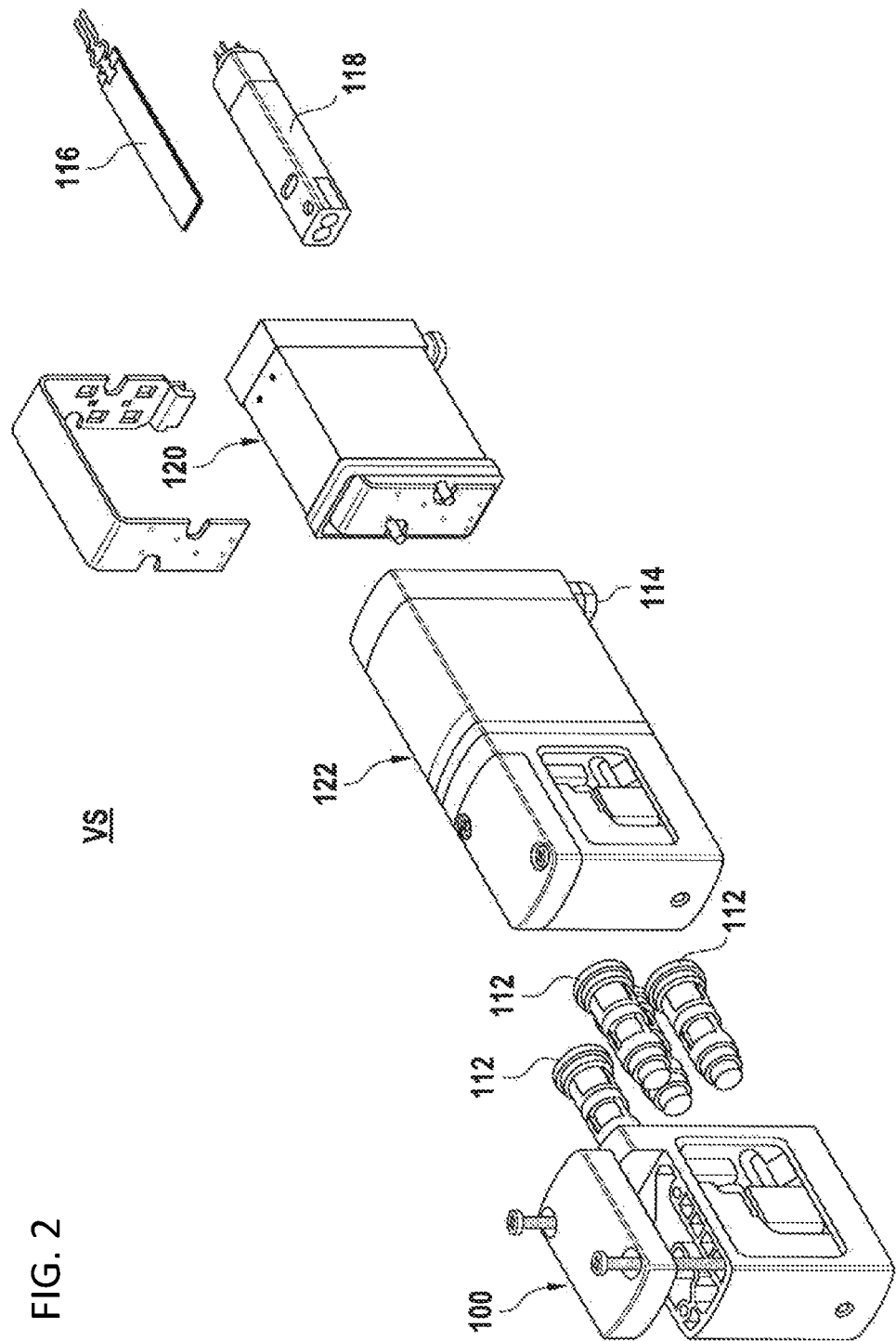
FIG. 2 shows an exploded view of a valve disk in one exemplary embodiment of the disclosure.

FIG. 2 shows the substantial components of a valve disk VS with a unit of four valves. It comprises a housing 100, in which the—in this exemplary embodiment—four booster cartridges 112 are mounted. The booster cartridges 112 serve to increase flow locally or at selective points. Arranged in a central part of the valve disk VS is an electronics circuit board 120, in which a serial synchronous data bus (serial peripheral interface, SPI) 114 is arranged, with which digital data can be exchanged according to a master-slave principle. The valve disk VS comprises, in addition to the electronics circuit board 120, a valve unit having valves 118 and a piezo-actuator 116. The piezo-actuator 116 typically comprises a plurality of layers of thin piezoelectric layers which expand or move when a voltage is applied and thus serves as an electropneumatic interface. The components are installed with a fastening element 122 to form a complete module.

Figure 3:
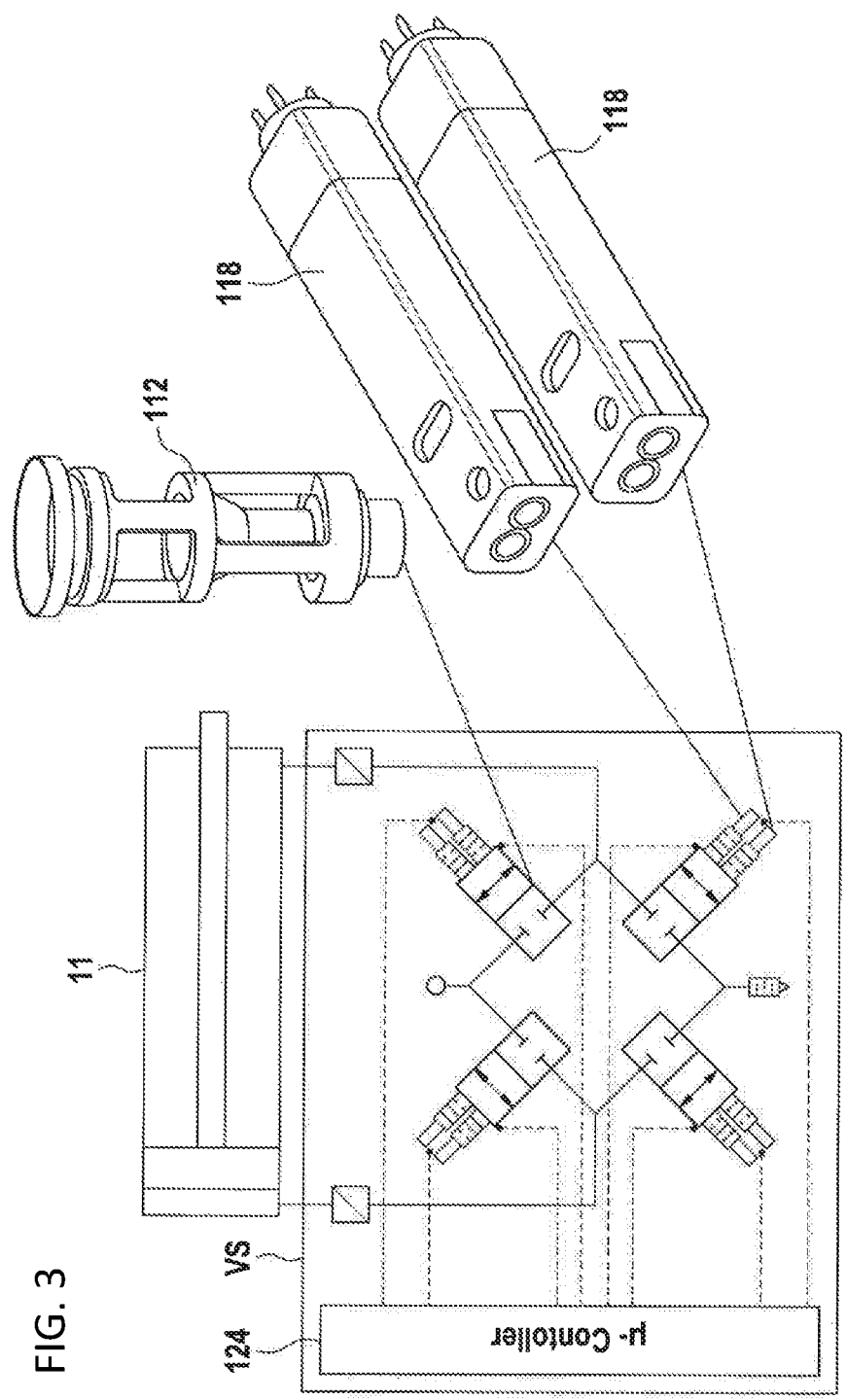
FIG. 3 shows further components of a valve disk.

FIG. 3 shows the structure of a valve disk VS according to a typical embodiment of the disclosure. It comprises four valves 118 in a valve unit which control two cylinder chambers of a cylinder independently of one another via a bridge circuit (e.g., in the manner of an electrical Wheatstone bridge) to be able to provide superior valve functions. A booster 112 serves in each case to increase flow. Each valve disk VS comprises a controller unit which can be designed e.g., as a microcontroller 124 to provide an activation voltage, which is defined corresponding to the movement task of the application A to execute a valve stroke or to adjust pressure ratios. In one embodiment of the disclosure, the microcontroller 124 serves to control the individual valves and communicates data, in particular exchanges data (bidirectionally) with the electronic valve controller 1 (not illustrated in the figure). In another embodiment of the disclosure, each valve disk VS has microcontrollers which, however, as an execution unit, serve to execute the application A; they communicate data with the respective other microcontrollers of other valve disks VS of the same valve island VI.

In accordance with the disclosure, the valve function of the valve disk VS (e.g., as 4/2–, 4/3, 2×3/2, 2×3/3 directional control valves etc.) and further functions, execution modes and operating conditions of the valve (e.g., soft stop, eco-mode, pressure control, flow control, etc.) can be adaptively changed by the application A. The selection of the valve functions and operating conditions is possible even when one and the same valve mechanism or valve construction is to be used. Therefore, in accordance with the disclosure, in the case of a specific pneumatic system (having specific physical components) the valve function can be adapted variably to the application case with the respective movement task.

Figure 4A:
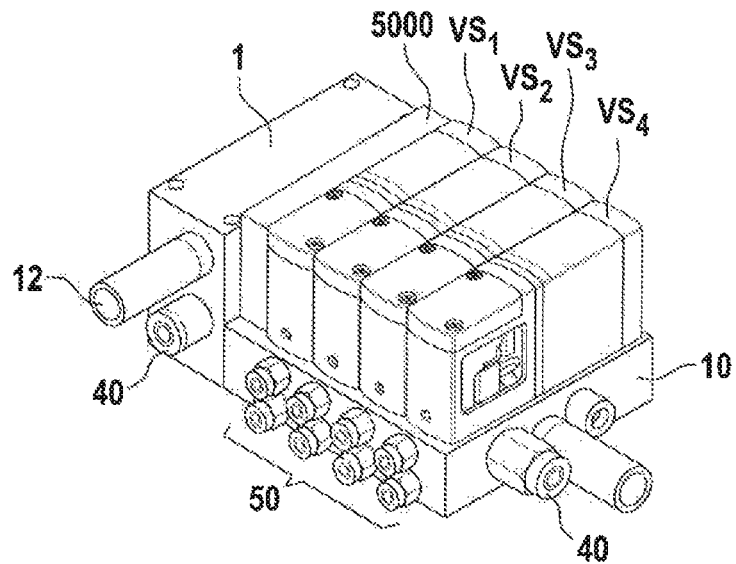
FIG. 4A is a schematic exemplary view of a valve island comprising four valve disks.
Figure 4B:
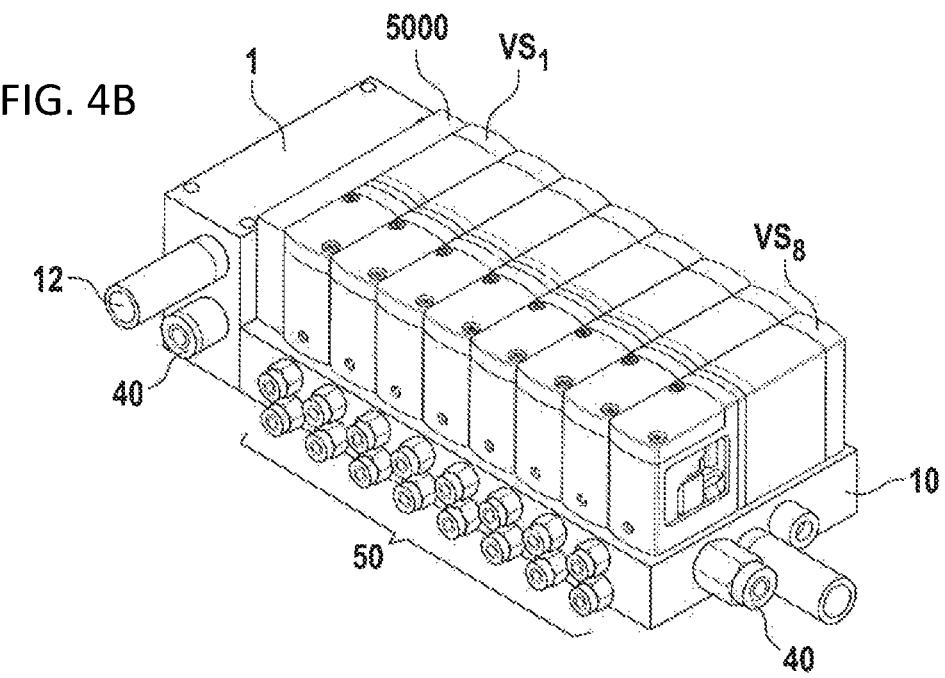
FIG. 4B shows a valve island comprising eight valve disks.

FIGS. 4A and 4B illustrate a valve island VI in different embodiment variants: FIG. 4A illustrates a valve island VI consisting of four valve disks VS and FIG. 4B illustrates a valve island VI consisting of eight valve disks VS. The reference sign 40 designates by way of example a supply connection or pressure connection. The valve island VI comprises an internal measurement signal unit 5000 for recording local measurement signals. The measurement signals can be all of the pneumatically relevant, physical measurement variables, such as temperature, pressure, position of the valve spool (stroke), flow, flow rate etc. The signals can be time-continuous or discrete signals. The respective physical variables can be determined by a plurality of sensors and are then provided as an averaged signal. The closed-loop control variables of the internal measurement signal unit 5000 which are to be recorded are defined in the code generation phase. Ventilation is designated by the reference sign 12. A plurality of working channels or working connections 50 control and move a working apparatus, in this case a piston-cylinder assembly 11, not illustrated.

In an exemplary embodiment, the electronic valve controller 1 can be used for technical diagnosis. To this end, corresponding measurement values are recorded via the sensor units 4000, 5000 and relayed to a diagnostic module. The diagnostic module can be formed e.g., on the calculation unit 1000. For example, it is possible to monitor a leakage in the application. To this end, the sensors can be arranged in the valve, in the tubing, in the screw-connections and in the cylinder. During (first) start-up, an ACTUAL status is recorded which serves as a DESIRED status and as a (good) reference. During the run time of the application A, it is possible by triggering the diagnostic task to determine the leakage level at the respective positions of the valve assembly as an ACTUAL status, if the cylinder is located in a position permitting the recording of the sensor data. After comparing between DESIRED status and ACTUAL status, the respective technical diagnostic information can be transmitted, e.g., as a status bit (e.g., "leakage increased") to the calculation unit 1000 and/or to the electronic valve controller 1. The respective parameters of the DESIRED status can each be determined in a learning run of the pneumatic system.

In a further exemplary embodiment, application monitoring can be executed, in that, e.g., a wear status of a pneumatic drive and/or a guide is to be determined. The breakaway pressure of the pneumatic drive and the run time between the end positions is recorded in the internal measurement signal unit 5000 taking into consideration the pressure level, the temperature and/or further parameters (previous movement, etc.). This status is then stored as a DESIRED status and as a reference during start-up. During the run time, after activating the monitoring task the tribological status of the pneumatic drive (including status data regarding friction and wear of the components) can be determined if the cylinder is in its end position. Depending upon the recording of the ACTUAL status and the comparison with the DESIRED status, the result is transmitted as a status bit (e.g., "friction increased") to a monitoring entity, e.g., the calculation unit 1000.

In a further exemplary embodiment, a valve status can be recorded by the recording of valve parameters at different positions in the valve disk VS, e.g.:

- at the piezo-bender,
- at the internal part of the pilot cartridge,
- at the lower sides of the u-shaped electronics circuit board 120, or
- at the inner front faces of the booster cartridges etc.

The DESIRED status is recorded by the manufacturer of the valve assembly and is stored as a reference. During the run time of the application A, by corresponding triggering of the monitoring task on the electronic valve controller 1 or on the calculation unit 1000 the system status of the valve or the valve disk VS can be determined and transmitted in a status bit (e.g., "check the valve").

Figure 6:
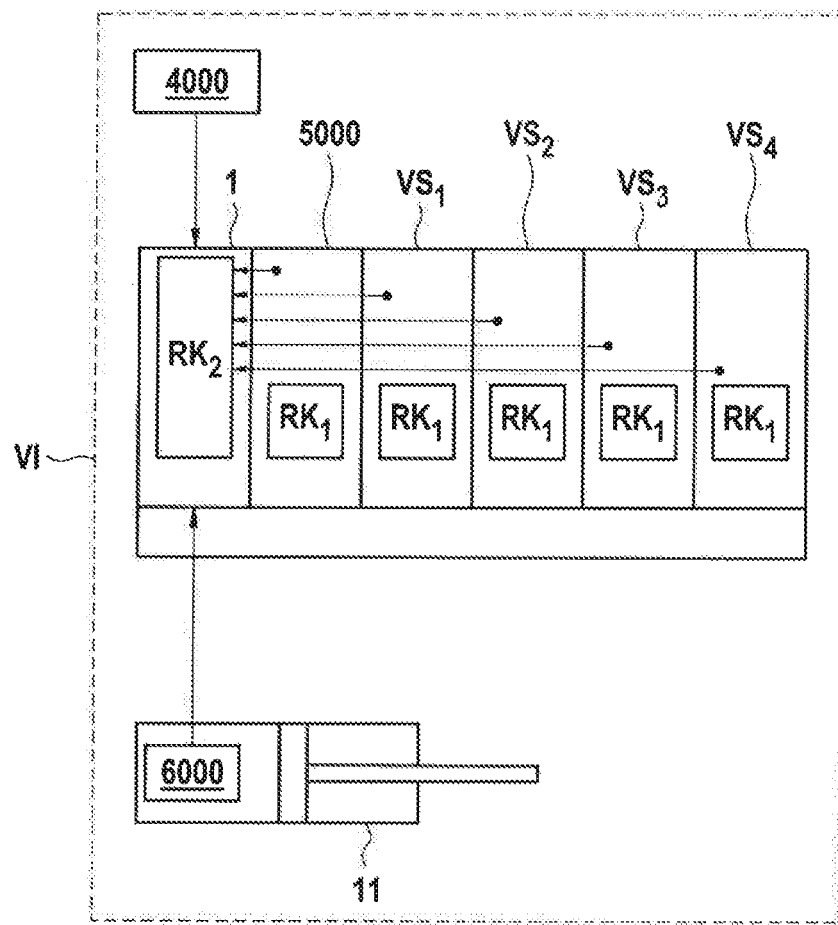
FIG. 6 shows a schematic view of different closed-loop circuits for controlling the valve assembly in a closed-loop manner.

FIG. 6 shows different closed-loop circuits which are used for the closed-loop control of the valve assembly. The valve island VI has the structure described in greater detail above and comprises four valve disks VS and an internal measurement signal unit 5000. Integrated on each valve disk VS is a first closed-loop circuit $RK_1$ which calculates internal sensor signals (recorded locally on the valve disk VS) to control them in a closed-loop manner. Typically, the internal sensor signals of the piston-cylinder sensor unit 6000 are calculated for the first closed-loop circuit $RK_1$ for the purpose of closed-loop control. In addition, the local measurement signals of the internal measurement signal unit 5000 can optionally also be calculated. A second closed-loop circuit $RK_2$ is integrated in the electronic valve controller 1. It serves to calculate the sensor signals which are read-in by the internal measurement signal unit 5000 and the piston cylinder sensor unit 6000. According to one embodiment of the disclosure, the external sensor unit 4000 is connected in terms of data technology to the valve island VI, in particular to the electronic valve controller 1, so that the external sensor unit 4000 can send the process signals recorded thereon directly to the electronic valve controller 1 for the purpose of closed-loop control. In this case, the external process signals are also calculated locally on the electronic valve controller 1 in addition to the sensor signals of the internal measurement signal unit 5000 and the piston-cylinder unit 6000, for the purpose of closed-loop control.

According to a typical embodiment of the disclosure, the movement task is recorded on the editor E and the application A is generated with the executable program code on the calculation unit 1000. The application A can then be distributed to one or a plurality of execution units for execution purposes. The execution units are digital entities or electronic components which are provided on a pneumatic valve or a valve assembly. The valve assembly can be the electronic valve controller 1 of a valve island VI and therefore a group of valve disks VS or the microcontroller 124 or another control unit of a valve disk VS. All of the modules of the pneumatic system exchange data so that a distributed solution can also be implemented.

Several advantages are associated with the disclosure. For instance, with the same construction (mechanical structure) of the valve disk VS and/or the valve island VI different valve functions can be activated (e.g., as a 4/2 or 4/3 directional control valve, with or without the eco-mode, with or without soft stop or flow control etc.). On the other hand, the different valve functions and thus the different movement tasks can be controlled centrally on only one mask of a user interface. The user interface is provided typically on the calculation unit 1000 or alternatively on the control apparatus SPS. This makes operation and control clear and simple. Furthermore, closed-loop control can be executed during execution of the movement task both on the basis of internal closed-loop control variables of the valve island VI or the valve disk VS and on the basis of external closed-loop control variables (e.g., process signals outside the valve island VI). The closed-loop control can result directly in a new version (new parameterisation) of the application A which is loaded in real time onto the execution units. A very rapid change of the movement task can also be performed without renewed parameterisation. In order to control the movement task, in-depth knowledge of fluid technology is no longer required on account of the selection of different applications A.

Finally, it is noted that the description of the disclosure and the exemplified embodiments are fundamentally to be understood to be non-limiting with respect to a specific physical implementation of the disclosure. All features explained and illustrated in conjunction with individual embodiments of the disclosure can be provided in different combinations in the respective subject matter in accordance with the disclosure to achieve the advantageous effects thereof at the same time. In particular, it is obvious to a person skilled in the art that the disclosure can be applied not only to valve islands in the form described but also to other groups of components with valve assemblies or valve circuits which each comprise pneumatic valves. Furthermore, the components of the pneumatic movement control system can be distributed over a plurality of physical products. Therefore, in particular the editor E, the calculation unit 1000 and the at least one execution unit 1, 124, SPS of the valve assembly VS, VI can be provided on different structural units.

The scope of protection of the present disclosure is set by the claims and is not limited by the features explained in the description or shown in the figures.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

REFERENCE SIGNS

VS valve disk
$VS_1$, $VS_2$ first valve disk, second valve disk, etc.
VI valve island
1 electronic valve controller SPS memory-programmable control apparatus
10 base plate of the valve island
11 piston-cylinder assembly
12 ventilation facility
14 electrical connections
40 supply connection
50 working connection
100 housing for booster cartridges
112 booster cartridge
114 serial synchronous data bus
116 piezoactuator
118 valve
120 electronics circuit board
122 fastening element
124 microcontroller
E editor
MEM memory
1000 calculation unit
1002 interpreter
1004 memory containing application objects
1006 compositor
1008 matcher
1010 database containing license data
1020 distributor
1022 execution unit
2000 library of application objects
A application
3000 closed-loop control interface
4000 external sensor unit
5000 internal measurement signal unit
6000 piston-cylinder sensor unit
$RK_1$ first closed-loop circuit
$RK_2$ second closed-loop circuit

The invention claimed is:

1. An electronic valve controller for an open-loop control and a closed-loop control of a pneumatic valve assembly configured to perform a pneumatic movement task, the electronic valve controller comprising:
a second processor configured to:
exchange data with a first processor via an interface, the first processor being configured to generate an application based on a pneumatic movement task inputted via an editor, the application being an executable computer-readable program code,
load the application for the open-loop control and the closed-loop control of the valve assembly on the electronic valve controller, and
execute the application on the electronic valve controller to perform the pneumatic movement task,
wherein the application comprises a first segment and a second segment,
wherein the first segment defines a main part,
wherein the second segment defines a desired specification-dependent part, and
wherein the main part remains unchanged during parametrization;
a memory comprising stored application objects;
wherein the first processor is further configured to:
separate the pneumatic movement task into a series of tasks,
access the memory to select, for each task, the application objects necessary for a respective task from a total set of all provided application objects to generate the executable computer-readable program code therefrom,
distribute the executable computer-readable program code to the second processor, and
load the executable computer-readable program code at the second processor, and
wherein the second processor is configured to execute the generated executable computer-readable program code, and optionally configured to record internal measurement signals as closed-loop control variables and to return the record internal measurement signals to the first processor to generate a modified executable computer-readable program code;
wherein the first processor is further configured to:
access an external memory storing a library of application objects requiring a license,
optimize the generation of the executable computer-readable program code in terms of pre-definable optimization criteria by:
analyzing whether application objects requiring a license exist in the external memory, which is required to execute the pneumatic movement task taking into consideration internal and external closed-loop control variables, and
requiring a license to be downloaded and utilized by a compositor when a license key for the application objects requiring the license is checked in the license memory to access the application objects of the external memory.

2. The electronic valve controller as claimed in claim 1, wherein the valve assembly is a valve island, wherein the valve island comprises a plurality of valve disks, and wherein each valve disk is configured to include a plurality of connected pneumatic valves.

3. The electronic valve controller as claimed in claim 1, wherein the electronic valve controller and an internal measurement signal unit are arranged on a valve island, and wherein the electronic valve controller is configured to receive local measurement signals of the valve assembly via an internal measurement signal unit and to compute the closed-loop control based on the received local measurement signals.

4. The electronic valve controller as claimed in claim 1, wherein the electronic valve controller is configured to control the valve assembly in the open-loop manner and in the closed-loop manner to move a piston in a piston-cylinder assembly, wherein the piston-cylinder assembly comprises a piston-cylinder sensor unit configured to detect internal sensor signals, and wherein the electronic valve controller is configured to compute the closed-loop control based on the detected internal sensor signals.

5. The electronic valve controller as claimed in claim 1, wherein the electronic valve controller is configured to modify and to parameterize the application based on at least one of:
local measurement signals of the valve assembly recorded on the internal measurement signal unit,
internal sensor signals of a piston-cylinder sensor unit, or
external process signals of an external sensor unit.

6. The electronic valve controller as claimed in claim 1, further comprising:
a plurality of first closed-loop circuits, wherein each valve disk of a valve island has a first closed-loop circuit from among the plurality of first closed-loop circuits, and wherein each first closed-loop circuit is configured to compute sensor signals from the respective valve disk; and a second closed-loop circuit which is integrated in the electronic valve controller and is configured to compute for the closed-loop control internal sensor signals of at least one of:

a piston-cylinder sensor unit, local measurement signals of an internal measurement signal unit, or external process signals of an external sensor unit.

7. The electronic valve controller as claimed in claim 1, wherein the electronic valve controller is configured to exchange data with a digital programmable control apparatus via a bus system, and wherein the application loaded onto the electronic valve controller is incorporated into a sequence program on the digital programmable control apparatus and is configured to trigger the execution of the application on the valve assembly via the digital programmable control apparatus.

8. The electronic valve controller as claimed in claim 1, wherein the electronic valve controller is configured to exchange data with a digital programmable control apparatus via a bus system, and wherein the digital programmable control apparatus is further configured to execute the pneumatic movement task via further control applications, which can be loaded onto the electronic valve controller.

9. A valve assembly configured to be controlled in the open-loop manner and the closed-loop manner by the electronic valve controller as claimed in claim 1.

10. A method for open-loop control and closed-loop control of a pneumatic valve assembly configured to execute a pneumatic movement task, the method comprising:

reading-in the pneumatic movement task, the pneumatic movement task being accessible from a library of application objects;

automatically generating an executable computer-readable program code for the open-loop control and the closed-loop control of the pneumatic valve assembly based on the pneumatic movement task;

loading the executable computer-readable program code as an application in real time on an electronic valve controller of the pneumatic valve assembly, executing the application on the electronic valve controller, wherein the application comprises a first segment and a second segment, wherein the first segment defines a main part, wherein the second segment defines a desired specification-dependent part, and wherein the main part remains unchanged during parametrization;

separating the pneumatic movement task into a series of tasks;

accessing a memory to select, for each task, application objects necessary for a respective task from a total set of all provided application objects to generate the executable computer-readable program code therefrom;

distributing the executable computer-readable program code;

loading the executable computer-readable program code;

executing the generated executable computer-readable program code;

recording internal measurement signals as closed-loop control variables and to return the record internal measurement signals generating a modified executable computer-readable program code;

accessing an external memory storing a library of application objects requiring a license; and optimizing the generation of the executable computer-readable program code in terms of pre-definable optimization criteria by:

analyzing whether application objects requiring a license exist in the external memory, which is required to execute the pneumatic movement task taking into consideration internal and external closed-loop control variables, and requiring a license to be downloaded and utilized by a compositor when a license key for the application objects requiring the license is checked in the license memory to access the application objects of the external memory.

11. The method as claimed in claim 10, further comprising:

closed-loop controlling the valve assembly with a plurality of first closed-loop circuits and at least one second closed-loop circuit during the executing of the application on the electronic valve controller of the valve assembly, wherein a first closed-loop circuit from among the plurality of first closed-loop circuits is implemented in each valve disk of a valve island and is configured to compute sensor signals from the valve disk, and wherein the second closed-loop circuit is integrated in the electronic valve controller and is configured to compute sensor signals from at least one of:

a piston-cylinder sensor unit, an internal sensor unit, or an external sensor unit.

12. The method as claimed in claim 10, the closed-loop controlling further comprising:

automatically calculating DESIRED specifications of at least one of:

recorded sensor signals, measurement signals, or external process signals.

13. The method as claimed in claim 10, wherein the closed-loop control of the valve assembly is affected in real time.

14. The method as claimed in claim 10, wherein the application is parameterized and DESIRED specifications are calculated for parameterizing the application.

15. The method as claimed in claim 10, further comprising:

specifying for the open-loop control or the closed-loop control at least one of the following operating conditions:

damping a piston movement by providing a damping function, controlling the speed of a piston in the closed-loop control by providing a throttle function for controlling the piston speed in a closed loop control, providing a pressure control and/or pressure progression control, controlling a time of execution of the movement task in a closed-loop control, controlling an energy efficiency of the movement task in a closed-loop control, executing a movement with intermediate stops and/or separate movement sections, controlling in the closed-loop control terms of application-specific parameters to be determined, or executing the movement task for the purpose of diagnosis; and calculating DESIRED specifications therefrom.

16. The method as claimed in claim 10, further comprising:
computing the closed-loop control of the valve assembly based on local measurement signals of at least one of:
an internal measurement signal unit,
internal sensor signals of a piston-cylinder sensor unit, or
external process signals of an external sensor unit.

17. A pneumatic movement control system for the open-loop control and closed-loop control of a pneumatic valve assembly for executing a pneumatic movement task, the pneumatic movement control system comprising:
a user interface configured to record the pneumatic movement task;
a first processor provided at a first location and configured to generate, based on the recorded pneumatic movement task, an executable computer-readable program code that is provided as an application, wherein the application comprises a first segment and a second segment, wherein the first segment defines a main part, wherein the second segment defines a desired specification-dependent part, and wherein the main part remains unchanged during parametrization; and
a valve assembly provided at a second location and including a second processor, the second processor being configured to read-in and execute the application to control the valve assembly in at least one of:
an open-loop manner according to the movement task, or
a closed-loop manner on the basis of internal closed-loop control variables and external process signals;
a memory comprising stored application objects;
wherein the first processor is further configured to:
separate the recorded movement task into a series of tasks,
access the memory to select, for each task, the application objects necessary for a respective task from a total set of all provided application objects to generate the executable computer-readable program code therefrom,
distribute the executable computer-readable program code to the second processor, and
load the executable computer-readable program code at the second location, and
wherein the second processor is configured to execute the generated executable computer-readable program code, and optionally configured to record internal measurement signals as closed-loop control variables and to return the record internal measurement signals to the first processor to generate a modified executable computer-readable program code;
wherein the first processor is further configured to:
access an external memory storing a library of application objects requiring a license,
optimize the generation of the executable computer-readable program code in terms of pre-definable optimization criteria by:
analyzing whether application objects requiring a license exist in the external memory, which is required to execute the recorded movement task taking into consideration internal and external closed-loop control variables, and
requiring a license to be downloaded and utilized by a compositor when a license key for the application objects requiring the license is checked in the license memory to access the application objects of the external memory.

18. The electronic valve controller as claimed in claim 2, wherein each valve disk is configured to include four or eight connected pneumatic valves.

19. The method as claimed in claim 15, wherein the damping function is a soft stop.

20. A non-transitory computer readable storage medium encoded with software comprising computer executable instructions and when the software is executed operable to:
read-in a pneumatic movement task, the pneumatic movement task being accessible from a library of application objects;
automatically generate an executable computer-readable program code for an open-loop control and a closed-loop control of a pneumatic valve assembly based on the pneumatic movement task;
load the executable computer-readable program code as an application in real time on an electronic valve controller of the pneumatic valve assembly;
execute the application on the electronic valve controller, wherein the application comprises a first segment and a second segment,
wherein the first segment defines a main part,
wherein the second segment defines a desired specification-dependent part, and
wherein the main part remains unchanged during parametrization;
separate the pneumatic movement task into a series of tasks;
access a memory to select, for each task, application objects necessary for a respective task from a total set of all provided application objects to generate the executable computer-readable program code therefrom;
distribute the executable computer-readable program code;
load the executable computer-readable program code;
execute the generated executable computer-readable program code;
record internal measurement signals as closed-loop control variables and to return the record internal measurement signals generate a modified executable computer-readable program code;
access an external memory storing a library of application objects requiring a license; and
optimize the generation of the executable computer-readable program code in terms of pre-definable optimization criteria by:
analyzing whether application objects requiring a license exist in the external memory, which is required to execute the pneumatic movement task taking into consideration internal and external closed-loop control variables, and
requiring a license to be downloaded and utilized by a compositor when a license key for the application objects requiring the license is checked in the license memory to access the application objects of the external memory.

21. The non-transitory computer readable storage medium as claimed in claim 20, further comprising instructions operable to:
closed-loop control the valve assembly with a plurality of first closed-loop circuits and at least one second closed-loop circuit when the application is executed on the electronic valve controller of the valve assembly,
wherein a first closed-loop circuit from among the plurality of first closed-loop circuits is implemented in each valve disk of a valve island and configured to compute sensor signals from the valve disk, and
wherein the second closed-loop circuit is integrated in the electronic valve controller and is configured to compute sensor signals from at least one of:
a piston-cylinder sensor unit,
an internal sensor unit, or
an external sensor unit.

* * * * *